United States Patent [19]

Liet

[11] Patent Number: 4,532,758
[45] Date of Patent: Aug. 6, 1985

[54] DEVICE FOR FORMING A COMPRESSED PRODUCE BALE

[75] Inventor: Cornelis H. Liet, Losser, Netherlands
[73] Assignee: Multinorm B.V., Netherlands
[21] Appl. No.: 584,803
[22] Filed: Feb. 29, 1984
[30] Foreign Application Priority Data
Mar. 1, 1983 [EP] European Pat. Off. ....... 83.810086.5
[51] Int. Cl.³ ...................... B30B 15/32; A01F 15/00
[52] U.S. Cl. ........................................ 56/341; 100/88; 100/89
[58] Field of Search ................ 56/341; 100/88, 89
[56] References Cited

U.S. PATENT DOCUMENTS 4,119,026 10/1978 Sacht ...................................... 56/341
4,302,923 12/1981 Molitorisz .............................. 56/341
4,375,187 3/1983 Kluver et al. ......................... 56/341

Primary Examiner—Gene Mancene
Assistant Examiner—David I. Tarnoff
Attorney, Agent, or Firm—Dalsimer, Kane, Sullivan and Kurucz Kane

[57] ABSTRACT

The invention relates to a device for forming a compressed produce bale, which is provided with a compacting cage, supported on an undercarriage, with an inlet for the produce and a pick-up for collecting the produce. The compacting cage has a polygonal, preferably square or rectangular cross section, and is bounded by at least approximately planar, stiff side walls, the inlet and the compacting cage being adjustable relative to each other in such a manner, that uniform filling of the whole cross sectional shape of the compacting cage is achieved.

18 Claims, 5 Drawing Figures

DEVICE FOR FORMING A COMPRESSED PRODUCE BALE

The invention relates to a device for forming a compressed produce bale, which is provided with a compacting cage, supported on an undercarriage, with an inlet for the produce and a pick-up for picking up the produce.

Such a device usually is coupled behind a tractor, the pick-up picking up the produce from the ground and the picked-up produce being rolled up tightly in the compacting cage to a bale of produce. Since the compacting cage of the known devices of this type has an approximately cylindrical cross section, an approximately cylindrical produce bale is formed. In practice however, such cylindrical produce bales have disadvantages. They are difficult to handle and difficult to stack for storage. Moreover, when they are stacked, there are always spaces between the cylindrical bales of produce and, when the whole stack is covered, there remain spaces at the circumference. For this reason, the stack of produce bales first of all occupies unnecessarily much space, while furthermore the outside air has ready access to the produce, which causes spoilage and degradation of the produce.

It is an object of the invention to provide a device of the aforementioned type, in which said disadvantages are eliminated in a simple yet suitable manner.

For this purpose, the device of the invention is characterized by the fact that the compacting cage has a polygonal cross section and is bounded by at least approximately planar, stiff side walls, it being possible to adjust the inlet and the compacting cage relative to each other in such a manner, that uniform filling of the whole cross-sectional shape of the compacting cage is achieved.

With such an arrangement, produce bales with planar sides are obtained, which are easier to handle and can be stacked quite simply. Moreover, especially when the produce bales have a square or rectangular cross section, there will no longer be any spaces in the stack of produce bales, as a result of which the keeping qualities of the produce are improved and a good quality remains assured.

In a simple embodiment of the invention, the compacting cage can be rotated about its central longitudinal axis and run in such a manner, that the supply of produce per unit time is greater at the corners of the compacting cage than in the middle part of the side walls.

Preferably, the compacting cage can be driven at the periphery at a constant velocity. By so doing and if approximately the same amounts of produce are picked up per unit time in the usual manner, the correct supply of produce to the compacting cage is achieved in a simple manner since, due to the varying distance of the point, at which the drive engages, from the central longitudinal axis of the compacting cage for said drive with constant velocity, the rotational velocity of the compacting cage and of the produce bale being formed in this cage automatically have the greatest value when the middle section of the side walls of the compacting cage passes by the inlet and the smallest value, when the corners of the compacting cage pass by the inlet.

In an advantageous embodiment of the invention, the side walls of the compacting cage are defined by rods, which are spaced a distance apart and whose ends are connected with two drivable, endless, flexible elements, for example chains, which are provided over their whole length with rods, which extends between the chains and are arranged at mutual distances from each other, the end walls of the compacting cage being defined by rotatably supported guide frames and the chains with the rods being connectable with the guide frame at a first peripheral point and disconnectable at a second peripheral point and the chains with the rods being guided between these two peripheral points on the one hand over a large portion of the periphery of the compacting cage and, on the other, along a return path outside of the compacting cage, the section of the periphery of the compacting cage, lying between the two peripheral points and being free of the chains with the rods, forming the inlet.

An alternative embodiment of the invention is characterized by the fact that the side walls of the compacting cage are defined by rotatable rollers, which are spaced a distance apart from each other and which are guided at one end so that they can slide in slots, which are formed in a vertical guide plate and which run radially to the central longitudinal axis of the compacting cage, a guide frame, which determines the cross section of the compacting cage, being arranged so that it can rotate about the central longitudinal axis of the compacting cage, the guide frame being drivable at the periphery and, in cooperation with the said ends of the rollers, determining the radial position of the rollers, the inlet being left free between two rollers in the vicinity of the pick-up.

The invention is explained below by means of the drawing, in which two examples of the operation of the inventive device are shown.

Figure 1:
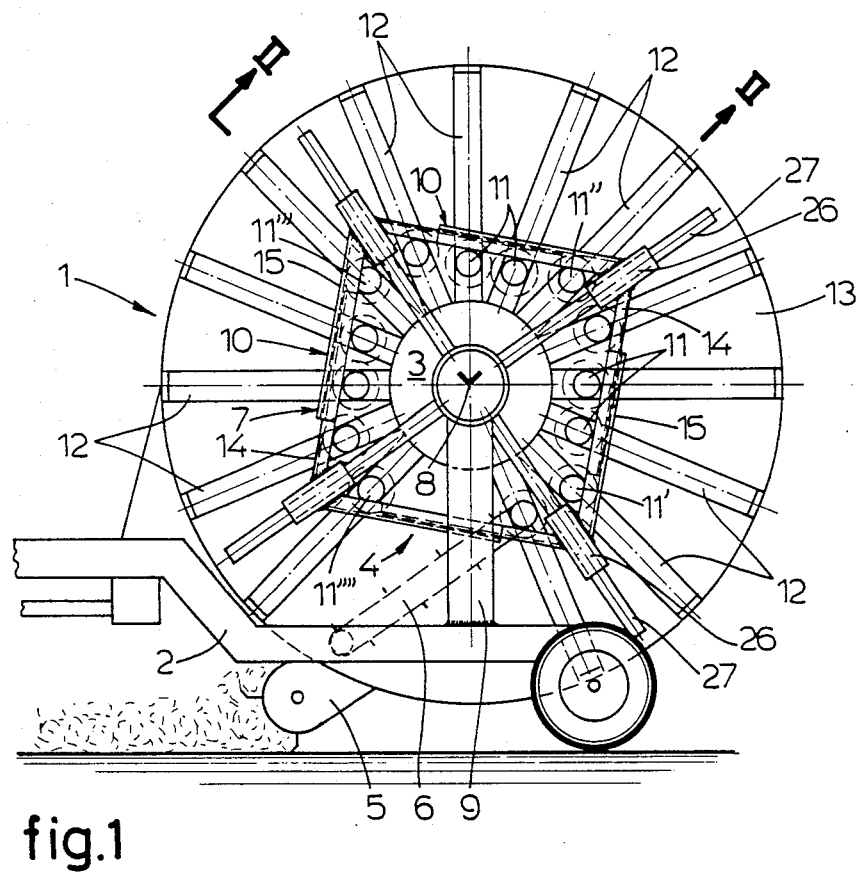
FIG. 1 is a schematically represented side view of a first embodiment of the inventive device.

In FIG. 1, a side view of a device 1 for forming a compressed produce bale is shown schematically. Device 1 is provided with a compacting cage 3, which is supported on an undercarriage and which has an inlet 4 for the produce. The undercarriage 2 moreover supports a pick-up 5. When in operation, device 1 is connected behind a tractor, which is not shown, the pick-up 5 picking up produced from the ground, whereupon the produce picked up is carried by a conveyor 6 to inlet 4.

Compacting cage 3 of the device shown in FIG. 1 has a square cross section, which is defined by a guide frame 7, which is supported by a support 7 in such a way, that it can rotate about the central longitudinal axis 8 of compacting cage 3, which runs perpendicularly to the direction of travel of device 1. The side walls 10 of compacting device 3 are defined by rotatable rollers 11, which are spaced a distance apart from each other and which are guided at one end so that they can slide in slots 12, which are formed in an approximately vertical guide plate 12 and which run radially relative to the central longitudinal axis.

Each of the sides of guide frame 7 consists of two elongated trough-shaped profiles 14 and 15, which can slide into each other and whose open side faces the central longitudinal axis 8. As can be seen from FIG. 2, guide frame 7 acts together with rollers 11, which are guided in slots 12, in that each roller is connected over two reversing gearwheels 16 with a wheel 17, that engages the trough-shaped profile 14 or 15 of guide frame 7. In this manner guide frame 7 determines the radial position of rollers 11 relative to the central longitudinal axis 8 of compacting cage 3. The ends of each roller 11 are moreover joined by hinges to ends 18, 19 of the crosswise running support rods 20, 21. The other end 22 of support rod 20 is pivoted in the corresponding slot 12 of guide plate 13, while the other end 23 of support rod 21 is pivoted in a support 24, which is arranged radially above the end of the corresponding roller 11, which is facing away from guide plate 13. This end 23 is also guided by sliding in this support 24. End 18 of support rod 20 is guided by sliding in a bearer 25, which is connected with the corresponding end of roller 11.

The trough-shaped profiles 14, 15, adjoining each other in the corners of compacting cage 3, are attached to guide bushes 26, which are mounted so that they can slide on the radial running rods 27. The inwards directed ends of rods 27 are mounted on a bushing 28, which is supported rotatably by support 9. As the compacting cage is being filled with the produce picked up, the guide bushes are forced from an initial position, in which the compacting cage has its smallest cross section, towards the outside into a final position, in which the produce bale formed has the desired dimensions.

When guide frame 7 is set going to rotate about the central longitudinal axis 8, rollers 11 will rotate due to the combined action of wheels 17 and profiles 14, 15 and assume each time a different radial position in such a way, that rotation of the compacting cage 3 about its longitudinal axis 8 is achieved, the bales of produce being formed rotating along due to the rotation of rollers 11. According to the invention, guide frame 7 is moreover set going in such a way, that more produce is supplied in unit time to the corners of compacting cage 3 than to the middle sections of side walls 10 of compacting cage 3. In this manner, a bale of produce can be formed with an approximately square cross section. It is moreover assumed that pick-up 5 picks up approximately the same amount of produce in unit time; this condition is generally fulfilled. In relation to the cylindrical bales of produce, which are usually formed in devices of this type, the bales of produce with a square cross section, which are formed in this manner, have the advantage that they easier to handle and can be stacked more readily. Moreover, there will hardly be any space between the bales of produce and just as little space will remain open when the stack is covered. For this reason, the stored produce is practically inaccessible to the outside air, so that the keeping qualities of the produce are improved and the quality is retained for a longer time.

Figure 2:
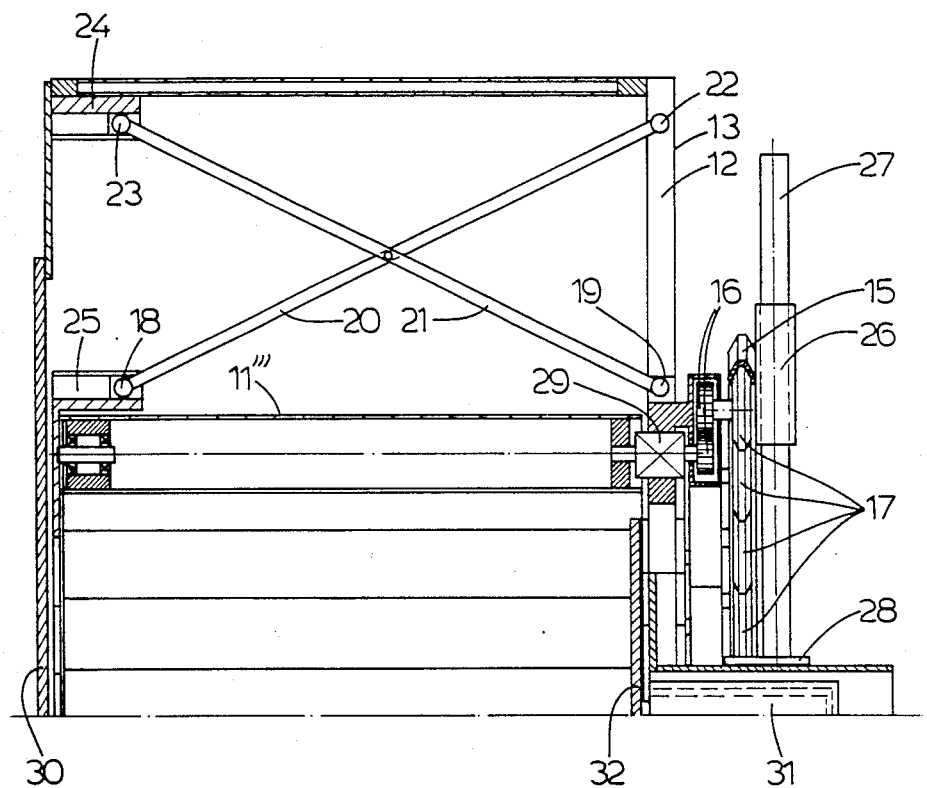
FIG. 2 is a section along the line II—II of FIG. 1.

In device 1, shown in FIGS. 1 and 2, guide frame 7 is driven over one of several rollers 11, which lie in the same relative position in regard to the inlet 4, for example, over rollers 11', 11'', 11''', 11''''. As can be seen from FIG. 2, roller 11''' is driven at constant speed by motor 29, which also drives the corresponding wheel 17 and, in so doing, guide frame 7 over reversing gearwheel 16. Owing to the fact that it is driven at its periphery at a constant speed, guide frame 7, and therefore compacting cage 3, will rotate with a varying speed as a consequence of the varying distance between driving wheel 17 and central longitudinal axis 8. Since the distance between wheels 17, which belong to rollers 11'-11'''', and the central longitudinal axis 8 is greatest at the very moment that the corners of the compacting 3 cage are filled, the rotational velocity of compacting cage 3 is least at this time. The rotational velocity is at its highest value while produce is being supplied to the middle sections of side walls 10 of compacting cage 3, because the distance of driving wheels 17 from longitudinal axis 8 is least at this instant.

The pressure on the produce bale being formed in compacting cageé 3 is applied by a pressure organ, which is not shown in the drawing and which engages, for example, at least one of the guide bushes 26 and exerts a radial force on this, which is directed towards the center. It is, for example, possible to arrange a spring between the ends of rods 27 and guide bushes 26.

When the developing produce bale has reached the desired size, the drive of guide frame 7 is stopped and a lid 30 can be swung open. Subsequently, the produce bale, which has been formed, can be removed from compacting cage 3 by means of a schematically indicated telescopic cylinder 31 and an ejection plate 32, which is actuated by this cylinder. After ejection plate 32 is retracted and lid 30 is closed, a further produce bale can be formed.

Figure 3:
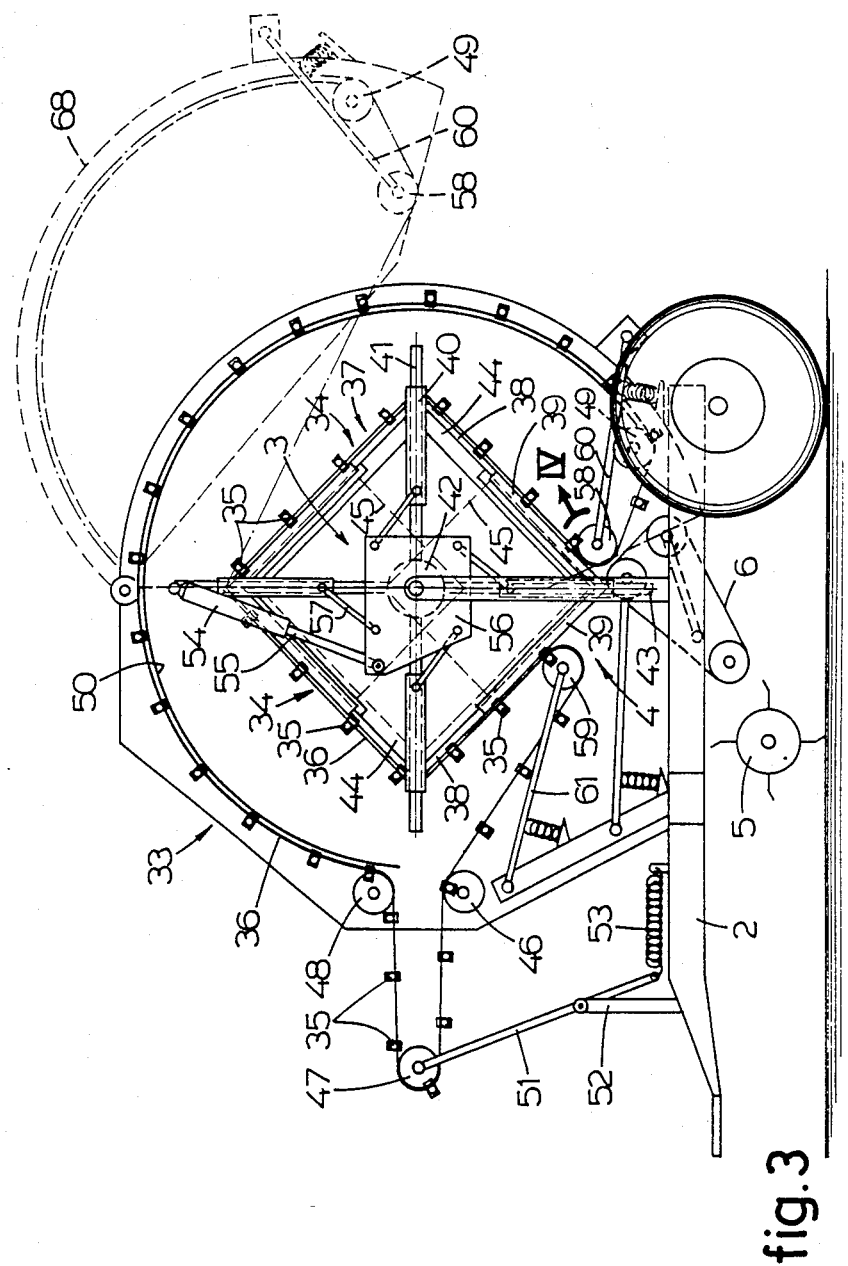
FIG. 3 is a schematically represented side view of a second embodiment of the inventive device.

FIG. 3 shows a device 33 for forming compressed produe bales, whose operation corresponds to that of device 1 in FIG. 1. Device 33 is also provided with a compacting cage 3, which is supported on an undercarriage 2. The pick-up 5, supported on undercarriage 2, picks up the produce from the ground, whereupon the picked-up produce is carried by conveyor 6 to inlet 4 of compacting cage 3.

In device 33, the side walls 34 of compacting cage 3 are defined by rods 35, which are spaced a distance apart and whose ends are connected with two drivable endless chains 36, only one of which can be seen in FIG. 3. Chains 36 are provided over their whole length with rods 35, which extend between the chains 36 and are arranged at mutual, equal, distances from each other.

Each of the end walls of the compacting cage is defined by a guide frame 37, which consists of two elongated elements 38, 39, which can slide into each other. The elements 38, 39, adjoining each other in the corners of compacting cage 3, are attached to guide bushes 40, which are mounted on radially running rods 41 and can slide back and forth between an initial and a final position. Rods 41 are connected with a bearer 42, which is rotatably supported on a support 43, which is mounted on the undercarriage. Each guide frame 37 is provided with four end panels 44, 45, whose corners are attached to guide frame 37. End panels 44, 45 can slide along one another and close off compacting cage 3 in the axial direction in every position of guide bushes 40.

As can be seen from FIG. 3, chains 36 with rods 35 are guided on guide frames 37 over a large section of the periphery of compacting cage 3, while chains 36 furthermore are guided along a return path outside of compacting cage 3. Rollers 46, 47, 48 and 49 are picked up in the return path of chains 36, while there is a fixed guidance system 50 for chains 36 between rollers 48 and 49. Rollers 47 for chains 36 are mounted at the end of a lever 51, which is supported on support 52 so that it can be turned, and whose other end is connected through a spring 53 with the undercarriage 2. Through these mans, rollers 47 act as a tensioning device for chain 36, a pressure also being exerted on the produce bale forming in compacting cage 3.

The pressure, which is exerted on the produce bale forming in compactor 3, can moreover be determined by means of a hydraulic cylinder 54, which is connected with guide bushes 40. For this purpose, piston rod 55 of cylinder 54 is rotatably connected with a coupling plate 56, which is also connected with guide bushes 40 through rods 57. The ends of rods 57 are rotatably mounted at guide bushes 40 or coupling plate 56. The end of cylinder 54, facing away from piston rod 55, is connected with the outwards directed end of one of the rods 41.

Chains 36 with rods 35 are connected by means of support rolls 58 with guide frame 37 in a first peripheral point of this guide frame, while these are disconnected in a second peripheral point of guide frame 37 through take-up rolls 59. Only one support roll 58 and one take-up roll 59 can be seen in FIG. 3. Inlet 4 lies between support rolls 58 and take-up rolls 59. Support rolls 58 and take-up rolls 59 are spring mounted by means of brackets 60 and 61.

Figure 4:
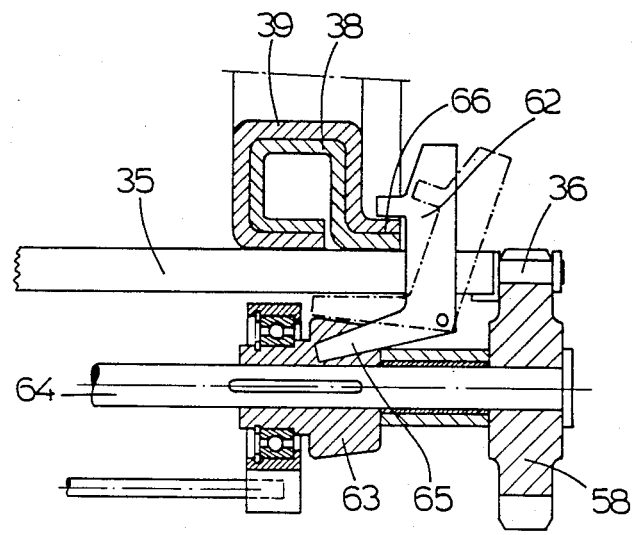
FIG. 4 shows detail IV of FIG. 3 in section, the actuating roller being in the operating position.
Figure 5:
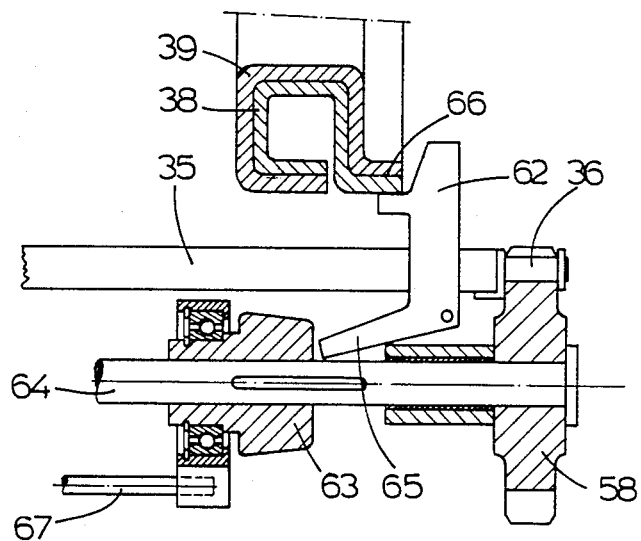
FIG. 5 is a section corresponding to FIG. 4, the activating roller being in the rest position.

For making connection with guide frame 37, each rod 35 is provided on both sides with a rotatably mounted hook 62, as can be seen in FIGS. 4 and 5. Hooks 62 are actuated by actuating rollers 63, which are arranged on the shafts of the support rolls 58 and the take-up rolls 59. One of the actuating rolls 63, mounted on shaft 64 of support roll 58, can be seen in FIGS. 4 and 5. On passing by support rolls 58, hooks 62 are tilted into a release position, indicated in FIG. 4 by a broken line, in that a projection 65 of hooks 62 is raised by actuating roll 63. After passing by rolls 58, hooks 62 drop back again into the operating position, in which hooks 62 engage a projecting flange edge 66 of guide frame 37. For this reason, rods 35 cannot be forced away from guide frame 37 by the produce bale, which is being formed in compacting cage 3. As hooks 62 pass by take-off roll 59, they are brought back into the release position by the appropriate actuating roll 63, so that rods 35 can be removed from guide frame 37.

Chains 36 are driven at constant speed by, for example, one of the rollers 46–49, so that guide frames 37 can also be driven at a constant speed at the periphery. Since the distance of support rolls 58 from the central longitudinal axis 8 of compacting cage 3 varies as guide frame 37 rotates, the rotational velocity of guide frame 37 and therefore of compacting cage 3 and of the compacting bale forming in this cage will also vary. Owing to the fact that support rolls 58 lie in the vicinity of inlet 4 of compacting cage 3, the rotational velocity of the compacting cage will be least when the corners of compacting cage 3 pass by inlet 4, because the distance of support rolls 58 from longitudinal axis 8 will be greatest at this instant. The rotational velocity will reach a maximum value as the middle sections of side walls 34 of compacting cage 3 pass by inlet 4. Such an arrangement ensures in a simple manner that the supply of produce per unit time to the corners of compacting cage 3 is greater than that to the middle section of the side walls 34 of compacting cage 3.

So that the produce bale formed can be removed from compacting cage 3, actuating rolls 63 are mounted so that they can slide on shaft 64 of support rolls 58 between an operating position, shown in FIG. 4, and a rest position, shown in FIG. 5. Actuating rolls 63 are actuated by means of a switching bar 67. In the rest position of actuating roll 63, shown in FIG. 5, projections 65 of hooks 62 are no longer raised on passing by support rolls 58, so that hooks 62 remain in the operating position and are forced against the side of flange edge 66, which faces away from compacting cage 3. As soon as all rods 35, which lie on the right side of compacting cage 3 according to FIG. 4, are disconnected in this manner from guide frame 37, a section of frame 68 can be swivelled into the open position, which is indicated in FIG. 3 by a broken line. Frame section 68 carries a part of the guiding system 50, as well as rollers 49 and support rolls 58. Compacting cage 3 is also open in the open position of frame section 68, so that the produce bale formed can be removed. When the produce bale is removed, actuating rolls 63 can once again be brought into the operating position and frame section 68 can be closed, whereupon a further produce bale can be formed.

It is noted that rolls 46–49 and support and take-off rolls 58, 59 are constructed as gearwheels in the example of the operation of FIG. 3.

Compacting cage 3 may, for example, also be constructed with a rectangular or triangular cross section instead of a square cross section.

The invention is not limited to the examples of the operation described above, which may be altered in various ways within the scope of the invention.

I claim:

1. Device for forming a compressed produce bale, provided with a compacting cage supported on an undercarriage and having an inlet for the produce and a pick-up for picking up the produce, wherein the compacting cage has a polygonal cross section and is bounded by at least approximately planar, stiff side walls, the inlet and the compacting cage being mutually adjustable in such a manner that a uniform filling of the whole cross section of the compacting cage is achieved; the compacting cage being rotatable about its central longitudinal axis and can be driven in such a manner, that more produce is supplied per unit time to the corners of the compacting cage than to the middle section of the side walls.

2. Device as defined in claim 1, wherein the longitudinal axis of the compacting cage runs perpendicular to the direction of travel.

3. Device as defined in claims 1 or 3, wherein the compacting cage can be driven at the periphery at a constant speed.

4. Device as defined in claim 3, wherein the side walls of the compacting cage are defined by rods, which are spaced a distance apart and whose ends are connected with two drivable, endless, flexible chains, which are provided over their whole length with rods, which extend between the chains and are arranged at mutual distances from each other, the end walls of the compacting cage being defined by rotatably supported guide frames and the chains with the rods being connectable with the guide frame at a first peripheral point and disconnectable at a second peripheral point of the guide frames and the chains with the rods being guided between these two peripheral points on the one hand over a large portion of the periphery of the compacting cage and, on the other, along a return path outside of the compacting cage, the section of the periphery of the compacting cage, lying between the two peripheral points and being free of the chains with the rods, forming the inlet.

5. Device as defined in claim 4, wherein each side of the guide frames comprises two elongated elements, which can slide into each other, the elements adjoining each other in the corners being attached to guide bushes, which are mounted on radially running rods and can slide back and forth between an initial and a final position, the rods being arranged so that they can rotate about the central longitudinal axis of the compacting cage.

6. Device as defined in claim 5, wherein chain tensioning devices are taken up in the return path of the endless chain.

7. Device as defined in claim 6, wherein the guide bushes are connected on both sides of the compacting cage with an organ, which can exert a force by way of the guide bushes on the produce bale to be formed in the compacting cage.

8. Device as defined in claim 7, wherein support or take-up rolls, which are spring-mounted through brackets, are arranged for the endless chain at the two peripheral points of the guide frames and which force the rods against the guide frames and remove the rods from the guide frames.

9. Device as defined in claim 8, wherein each rod of the endless chain is provided on both sides with a rotatably mounted hook, which can work together with a connecting element of the corresponding guide frame, actuating rolls, which bring the hooks into a release position as they pass by the support or take-up rolls, being arranged on the shafts of the support and take-up rolls while the hooks, after passing by the actuating rolls, return back to an operating position, in which the hooks of the rods, pressed against the guide frame, engage the connecting element of the guide frame.

10. Device as defined in claim 9, wherein the actuating rolls, mounted on the shaft of the support rolls, are adjustable between an operating position and a rest position, the hooks being actuated only in the operating position of the actuating rolls and remaining disconnected in the rest position of the connecting element of the guide frame, the return pass of the endless chains including a section, which is arranged before the support rolls and which, together with the brackets of the support roll, is mounted in a section of frame, which can be swivelled out of a position, in which the support rolls force the rods against the guide frames, the hooks from at least the section of the coupling element facing this section of the frame being disconnected, into an open position in which the bale of produce, formed in the compacting cage, can be carried away.

11. Device as defined in one of the claim 10, wherein each guide frame is provided with four end panels whose corners are fastened to the corresponding guide frame and which can slide along one another and close off the compacting cage in the axial direction in every position of the guide bushes.

12. Device as defined in claims 1 or 2 wherein the side walls of the compacting cage are defined by rotatable rollers, which are spaced a distance apart from each other and which are guided at one end so that they can slide in slots, which are formed in a vertical guide plate and which run radially relatively to the central longitudinal axis of the compacting cage, a guide frame, which determines the cross section of the compacting cage, being arranged so that it can rotate about the central longitudinal axis of the compacting cage, the guide frame being drivable at the periphery and, in cooperation with the said ends of the rollers, determining the radial position of the rollers, the inlet being left free between two rollers in the vicinity of the pick-up.

13. Device as defined in claim 12, wherein each side of the guide frame comprises two elongated elements, which can slide into each other, the elements adjoining each other in the corners of the compacting cage being attached to guide bushes, which are mounted on radially running rods and can slide back and forth between an initial and a final position, the rods being arranged so that they can rotate about the central longitudinal axis of the compacting cage.

14. Device as defined in claim 13, wherein at least one of the rollers can be driven by a motor, the motor also driving the guide frame over reversing gear wheels.

15. Device as defined in claim 14, wherein the longitudinal elements comprise trough-shaped profiles, which can slide into each other and whose open sides face the central longitudinal axis of the compacting cage, the guide frame being driven over at least one drive wheel, which engages the trough-shaped profile of the guide frame, while the rollers, which are not driven, act together with the trough-shaped profile of the guide frame over corresponding wheels.

16. Device as claimed in claim 15, wherein a pressure organ, which can exert a pressure on the produce bale to be formed, can engage at least one of the guide bushes.

17. Device as defined in one of the claim 16, wherein the compacting cage is closed off at the end, facing away from the guide plate, by a lid, which can be swung away, while at the end, adjoining the guide plate, there is an ejector plate, which can be adjusted in the direction of the lid by means of a telescopic pressure cylinder.

18. Device as defined in one of the claim 17, wherein the ends of each roller are joined by hinges to the ends of the crosswise running support rods, whose other ends are pivoted in the corresponding slot in the guide plate or are mounted in a support, which is arranged radially above the end of the corresponding roller, facing away from the guide plate, the ends of the support rods, facing away from the guide plate, being connected with the ends of the corresponding roller or with the support in such a way, that that they can slide in the direction of the longitudinal axis of the compacting cage.

* * * * *